United States Patent Office 2,914,579
Patented Nov. 24, 1959

2,914,579

XYLENE-FORMALDEHYDE CONDENSATION PRODUCTS

Walter J. Erich, New York, N.Y., assignor to Allied Chemical Corporation, a corporation of New York No Drawing. Application December 14, 1956
Serial No. 628,244

2 Claims. (Cl. 260—668)

This invention relates to new and improved liquid xylene-formaldehyde condensation products and methods of preparing them.

Liquid xylene-formaldehyde condensation products have been found useful as plasticizers in polyvinyl chloride resins and phenolic laminating varnishes in that they combine flexibility, good dielectrical properties, good oil resistance and cheapness. Unfortunately, the liquid xylene-formaldehyde condensation products were often found too high in viscosity to be suitable for use as a plasticizer. Also, the xylene-formaldehyde condensation products are generally dark in color and do not meet the requirements of an almost water-white plasticizer.

An object of the present invention is to provide a liquid xylene-formaldehyde condensation product of good color suitable for use as a plasticizer.

Another object of the present invention is to provide a liquid xylene-formaldehyde condensation product of low viscosity adapted for use as a plasticizer.

A further object of the invention is to provide a method for controlling the viscosity of liquid xylene-formaldehyde condensation products.

A still further object is to provide a method for producing liquid xylene-formaldehyde condensation products of good color and low viscosity suitable for use as plasticizers.

Another object is to provide a method for selectively reacting formaldehyde with a mixture of xylenes to produce liquid xylene-formaldehyde condensation product of good color. Other objects and advantages of the present invention will be apparent from the following description.

In accordance with the present invention, liquid xylene-formaldehyde condensation products of good color may be produced by heating a mixture of xylenes containing at least 50% meta xylene by weight of the total amount of xylenes in the mixture and formaldehyde or paraformaldehyde in the proportion of 1 to about 4 mols xylene to 1 mol formaldehyde with sufficient meta xylene in said mixture to provide a stoichiometric excess of meta xylene, i.e. at least 1 mol of meta xylene per mol of formaldehyde, preferably 1–2 mols meta xylene, in the presence of dilute sulfuric acid catalyst of concentration between 25–50% $H_2SO_4$, preferably 30–40% $H_2SO_4$ concentration, for a sufficient length of time, preferably under reflux (about 95–110° C.), to effect selective condensation of the formaldehyde with meta xylene and terminating the reaction before 70%, preferably before 50%, of the total xylenes in the reaction mixture have condensed.

The incorporation of a small amount of methanol, about 5–15% methanol by weight of the formaldehyde in the mixture of xylene and formaldehyde reactants, results in the production of a reaction product of low viscosity of the order of 100–1500 centipoises. Variations within this range of viscosity may be controlled by changing the amount of methanol in the mixture. The molecular weight of the xylene-formaldehyde-methanol reaction products is within the range of about 250–300.

While I do not wish to predicate my invention on any theory of the mechanism of the reaction, the following equations and explanations indicate the probable course of the reaction and will aid in understanding of the process.

In general aromatic hydrocarbons react readily with formaldehyde in the presence of acidic catalysts producing a variety of substances ranging from single methylol and methylene derivatives to complex reaction products in which large numbers of aromatic molecules are linked together by methylene groups.

Two important hydrocarbon-formaldehyde reactions are (1) the formation of nuclear methylol alcohols and (2) the formation of methylene derivatives.

The liquid xylene-formaldehyde reaction product is a condensation product produced by reacting xylene with formaldehyde in the presence of dilute sulfuric acid, as illustrated by the following equation:

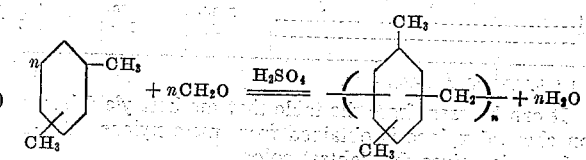

The fundamental starting point is the formation of aryl alcohols. These substances are formed by the reaction of formaldehyde with xylene under appropriate conditions of catalysts and temperature:

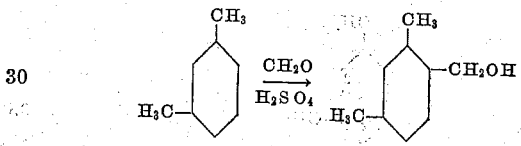

The nuclear methylol group then reacts with a reactive o- or p-hydrogen in adjacent xylene molecules to form a methylene bridge by the elimination of one molecule of water:

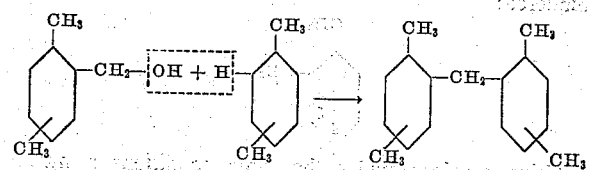

The formation of methylene bridges increases rapidly for the first ten hours and then levels off to a constant value. The percentage of unreacted formaldehyde decreases accordingly.

The formation of methylol groups increases sharply for the first four hours and then falls off to a constant value at the point where the rate of formation is equal to the rate of conversion into methylene bridges.

Although higher polynuclear methylene-linked hydrocarbon condensation products are the major products, aryl methyl polyoxymethylene bridges are formed when an excess of formaldehyde is used under conditions favoring oxygen rich resins (Zinke and Ziegler, Wiener Chemiker Z., 47, 151 (1944)) (Wegler, Z. Angew. Chem. A60, 88–96 (1948)):

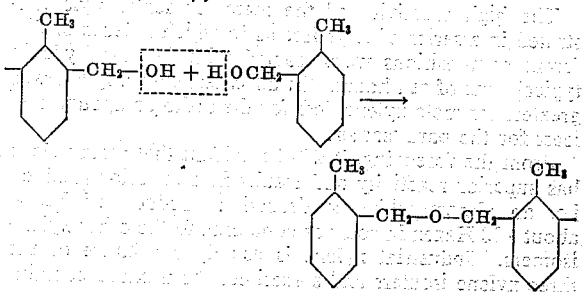

A series of tests was carried out to determine the reactivity of the three isomers of xylene (o, m, p) and to determine the effect of the position of the methyl groups on the color, viscosity and yield of the product. The results of these tests are summarized below in Table I:

TABLE I

*Reactivity of the xylenes*

| Catalyst Concentration<br>Mol Ratio Xylene to Formaldehyde | 37% H₂SO₄<br>1/1 | | |
|---|---|---|---|
| Type of Xylene | Ortho | Meta | Para |
| Time (Hrs.) | Yield (Percent) Based on Charged Xylene | | |
| 24 | 33.8 | 90.5 | 17.7 |
| 48 | 51.2 | 91.5 | 33.3 |
| | Color (Hazen)[1] | | |
| 24 | 500+ | 60 | 500 |
| 48 | 210 | 100 | 425 |

[1] A.S.T.M. Test D-1045-49T.

It can be seen from the table that the best yield based on charged xylene is obtained from meta xylene. Meta xylene also gives the lightest color.

Apparently the superior reactivity of meta xylene (91.5% yield based on charged xylene) can be attributed to the reinforcing influence of the strong para and moderate ortho direction to the number four position:

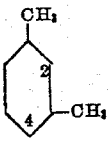

Of the two positions available in o-xylene, one (4) is under the strong para influence of a methyl group, and the other (3) is ortho activated and moderately hindered:

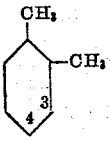

Using o-xylene under the same conditions a much lower yield (51.2%) of condensation product was obtained.

Para-xylene gave the lowest yield (33.3%). In p-xylene the only position available corresponds to the less reactive 3-position of o-xylene and consequently this hydrocarbon is the least reactive to substitution. Para-xylene also gave the darkest color.

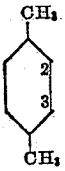

The high reactivity of the meta isomer was demonstrated in a series of experiments in which xylenes of different compositions were reacted with formaldehyde in typical runs of ten hours. In all cases, consumption was greatest for meta xylene, less for the ortho compound and least for the para isomer.

From the foregoing, it will be evident that meta xylene has superior reactivity and results in a superior product, i.e. an almost white condensation product, of below about 100 Hazen in color as compared to the other xylene isomers. Industrial xylene is usually a mixture of the three xylene isomers and sometimes the mixture contains a small amount of an inert material such as ethyl benzene. To separate pure meta xylene isomer from such mixtures would be expensive; however, it will be relatively inexpensive to increase the concentration of the meta xylene isomer in the industrial mixture to about 50% by weight of the total xylenes in the mixture. Although pure meta xylene isomer may be employed to react with formaldehyde to produce a liquid xylene-formaldehyde condensation product of good color, I have found that the far less expensive mixtures of xylenes may be selectively reacted with formaldehyde to produce liquid xylene-formaldehyde condensation products of almost white color, i.e. below about 100 Hazen color, provided the conditions are set so (a) the mixture of xylenes contains at least 50% by weight meta xylene of the total amount of xylenes in the mixture; (b) there is sufficient meta xylene in the mixture to provide a stoichiometric excess of meta xylene, i.e. at least one mol of meta xylene per mol of formaldehyde, and (c) terminating the reaction before 70%, preferably before 50%, of the total xylenes in the reaction mixture have condensed.

The condensation reaction may be carried out by introducing sulfuric acid catalyst, xylene and formaldehyde into a conventional steam jacketed vessel equipped with reflux condenser and heating the mixture with stirring to reflux temperature, about 95–125° C. The concentration of the sulfuric acid should be below 50%, between 35–50% H₂SO₄, preferably 30–40% H₂SO₄. An increase in catalyst concentration above 50% causes darkening of the color of the product and at concentrations below 25% H₂SO₄ the reaction is unduly prolonged. Formaldehyde and paraformaldehyde may be employed as a reactant. The term formaldehyde as used in the claims embraces formaldehyde and paraformaldehyde. The ratio of xylene reactant to formaldehyde should be in the proportion of at least one mol xylene per mole formaldehyde and preferably not more than 4 mols of xylene per mol of formaldehyde. The amount of meta xylene isomer should be in the proportion of at least one mol of meta xylene isomer per mol of formaldehyde and preferably between 1 and 2 mols meta xylene isomer per mol of formaldehyde. To effect selective condensation of the formaldehyde with the meta xylene isomer and avoid formation of color bodies in the resin product, reaction should be terminated before 70%, preferably before 50%, of the xylenes in the reaction mixture have condensed. Ordinarily, 10 to 20 hours will be sufficient to effect condensation. In some instances, dependent upon reaction mixture, longer reaction time may be employed, but care should be taken to avoid overcondensation with darkening of color. Reduction of the mol ratio of xylene-formaldehyde below 1:1 also causes progressive darkening of the color of the product. Increasing the molar ratio of xylene-formaldehyde above 4:1 dilutes the reaction mixture and has no beneficial effect on the reaction.

After completion of the condensation reaction, the mixture is cooled to form two layers, an acid layer and a xylene layer. The lower acid layer is separated and the upper layer is washed with water and neutralized with caustic soda or lime. Excess xylene and unreacted formaldehyde if any are removed, for example by distillation, by heating to a temperature up to 225° C. at atmospheric pressure. The reaction product is cooled and filtered. The acid layer may be reused by bringing it up to the desired concentration by the addition of concentrated sulfuric acid. Unreacted xylene may be used as solvent grade xylene.

The addition of small amounts of methanol to the reactants in an operation as described above gave reaction products of low viscosity. This "methanol effect" appears to be quite pronounced.

When commercial 37% formalin with 12% added methanol was used in typical runs of ten hours, the final reaction products had viscosities ranging from 320 to 512 centipoises. A 37% solution of formalin, made by adding water to paraformaldehyde and then adding methanol to give a methanol content of 12%, was used in a typical run. This material gave a reaction product of 772 centipoises. When the methanol was omitted from the solution, the final reaction product had a viscosity of 15,240 centipoises. A commercial 37% formalin solution containing no methanol gave a resin of 23,200 centipoises. All the above data are tabulated in Table II below:

TABLE II

| Cat. Conc. (Percent) | Time (Hrs.) | Xylene (m, p) Formaldehyde | Methanol (Percent) | Type of Formalin | Viscosity (cps.)[1] |
|---|---|---|---|---|---|
| 37 | 10 | 3/1 | 12 | Commercial | 512 |
| 37 | 10 | 3/1 | 12 | do | 320 |
| 37 | 10 | 3/1 | 12 | Paraformaldehyde | 772 |
| 37 | 10 | 3/1 | 0 | do | 15,240 |
| 37 | 10 | 3/1 | 0 | Commercial | 23,200 |

[1] Viscosity was determined with a Brookfield viscosimeter (Model RVF), Barrett Method U-325.

By varying the methanol content, a close control on the viscosity and molecular weight of the final reaction product was maintained. This fact was demonstrated in a series of experiments in which the methanol content of the formaldehyde was varied from 5% to 15%. The viscosity of the final reaction product ranged from 152 to 1272 centipoises. The reason for this change in viscosity and molecular weight produced by the addition of methanol is that methyl ethers are formed from the reaction of free hydroxy groups with methanol. An analysis performed on the final reactions products showed that the reaction product made from formaldehyde with 5% added methanol had more free hydroxyl groups present than the reaction product made from formaldehyde with 15% methanol content. The data illustrated above is summarized in Table III below:

TABLE III

| Cat. Conc. (Percent) | Time (Hrs.) | Xylene (m, p) Formaldehyde | Methanol (Percent) | Viscosity | Mol. Weight | Hydroxy, Percent |
|---|---|---|---|---|---|---|
| 37 | 10 | 3/1 | 5 | 1,272 | 294 | 1.82 |
| 37 | 10 | 3/1 | 10 | 880 | 274 | 1.60 |
| 37 | 10 | 3/1 | 15 | 152 | 250 | 1.21 |

The following example illustrates the present invention:

EXAMPLE I

Into a reaction vessel equipped with a stirrer and reflux condenser is charged the following materials in the order given. Add $H_2SO_4$ to water slowly with stirring.

| | Parts by weight |
|---|---|
| $H_2O$ | 5155 |
| $H_2SO_4$ | 3430 |
| Paraformaldehyde | 836 |
| Xylene[1] | 8029 |
| Methanol | 246 |

[1] A commercial xylene having the following composition: ortho-xylene 28.0%, meta xylene 47.3%, para xylene 6.4% and ethyl benzene 20.4%.

While stirring the charge, the reaction vessel is heated to raise the temperature of the contents slowly to reflux. About one hour is required to reach reflux. Faster heating may cause extensive foaming. The initial reflux temperature is about 95° C. and rises gradually to about 105° C. Reflux is maintained with stirring for 10 hours after which the reaction mixture is cooled. Separation of the mixture occurs rapidly into an upper reaction product layer and a lower acid layer. The lower acid layer is removed and may be retained for reuse. The reaction produce layer is then given two washings with 2800 parts by weight water in each washing and the water layer discharged. To the reaction mixture 2800 parts by weight $H_2O$ and 15 parts CaO are added and the mixture stirred to neutralize the reaction mixture.

The water layer is then separated and discarded. The reaction mixture is then heated up to a pot temperature of 225° C. at atmospheric pressure to distill off excess xylene. This xylene is not reused in the process but may be sold as a solvent. The reaction product is cooled to room temperature and filtered through a sintered glass filter to remove any impurities. The acid layer recovered is 8947 parts by weight having a 35.7% $H_2SO_4$ concentration. Recovered xylene is 4833 parts by weight. The reaction product is 2954 parts by weight. The yield of reaction product based on paraformaldehyde and based on unrecovered xylene, neglecting added methanol, is 98.4% and 83.1%, respectively. The reaction product has a Hazen color of 80 and a viscosity at 27° C. of 129 centipoises.

Although certain preferred embodiments of the invention have been disclosed for purpose of illustration, it will be evident that various changes and modifications may be made therein without departing from the scope and spirit of the invention.

I claim:

1. A liquid xylene-formaldehyde-methanol reaction product adapted for use as a plasticizer having a viscosity of 100–1500 centipoises, a molecular weight of about 250–300 and a color of below 100 Hazen, produced by heating to a temperature of about 95–125° C., a mixture of ortho xylene, meta xylene and para xylene containing at least 50% meta xylene by weight of the total amount of xylenes in the mixture and formaldehyde in the proportion of from 1 to 4 mols xylene to 1 mol formaldehyde with sufficient meta xylene in said mixture to provide at least 1 mol of metal xylene per mol of formaldehyde and about 5–15% methanol by weight of the formaldehyde in the presence of dilute sulfuric acid catalyst of concentration between 25–40% $H_2SO_4$ for sufficient length of time to effect selective condensation of the formaldehyde with meta xylene and terminating the reaction before 70% of the total xylene in the reaction mixture have condensed.

2. A liquid xylene-formaldehyde-methanol reaction product adapted for use as a plasticizer having a viscosity of 100–1500 centipoises, a molecular weight of about 250–300 and a color of below 100 Hazen, produced by heating to a temperature of about 95–125° C., a mixture of ortho xylene, meta xylene and para xylene containing at least 50% meta xylene by weight of the total amount of xylenes in the mixture and formaldehyde in the proportion of from 1 to 4 mols xylene to 1 mol formaldehyde with sufficient metal xylene in said mixture to provide at least 1 mol of meta xylene per mol of formaldehyde and about 5–15% methanol by weight of the formaldehyde in the presence of dilute sulfuric acid catalyst of concentration between 25–40% $H_2SO_4$ for sufficient length of time to effect selective condensation of the formaldehyde with meta xylene and terminating the reaction before 50% of the total xylenes in the reaction mixture have condensed.

References Cited in the file of this patent

UNITED STATES PATENTS

| 1,214,414 | Berend | Jan. 30, 1917 |
| 2,819,322 | Fetterly | Jan. 7, 1958 |

FOREIGN PATENTS

| 446,450 | Great Britain | Apr. 20, 1936 |
| 598,068 | Great Britain | Feb. 10, 1948 |
| 871,645 | Germany | Mar. 26, 1953 |
| 786,668 | Great Britain | Nov. 20, 1957 |

OTHER REFERENCES

Fulton et al.; Industrial and Engineering Chem., vol. 32, No. 3, March 1940 pages 304–309.

Walker: Formaldehyde, 2nd Ed., 1953, Monograph Series, No. 120, published by Reinhold Publishing Corporation, N.Y.

UNITED STATES PATENT OFFICE
CERTIFICATE OF CORRECTION

Patent No. 2,914,579             November 24, 1959

Walter J. Erich

It is hereby certified that error appears in the printed specification of the above numbered patent requiring correction and that the said Letters Patent should read as corrected below.

Column 4, line 25, for "35" read -- 25 --; column 5, line 71, for "produce" read -- product --; column 6, line 32, for "metal" read -- meta --; line 38, for "xylene" read -- xylenes --; line 49, for "metal" read -- meta --.

Signed and sealed this 6th day of December 1960.

(SEAL)
Attest:

KARL H. AXLINE
Attesting Officer

ROBERT C. WATSON
Commissioner of Patents